(12) United States Patent
Buitendag et al.

(10) Patent No.: US 9,533,897 B2
(45) Date of Patent: Jan. 3, 2017

(54) METHOD FOR ELECTRO-CHEMICAL ACTIVATION OF WATER

(71) Applicant: RADICAL WATERS INTERNATIONAL, LTD., Tortola (VG)

(72) Inventors: Mathys Jacobus Buitendag, Gauteng (ZA); Philip Nel, Randburg (ZA); Daniel Francois Jensen, Centurion (ZA); Hendrik Frederik du Plessis, Santiago (CL)

(73) Assignee: RADICAL WATERS INTERNATIONAL LTD., Tortola (VG)

( * ) Notice: Subject to any disclaimer, the term of this patent is extended or adjusted under 35 U.S.C. 154(b) by 401 days.

(21) Appl. No.: 14/192,215

(22) Filed: Feb. 27, 2014

(65) Prior Publication Data
US 2014/0318981 A1   Oct. 30, 2014

Related U.S. Application Data

(60) Provisional application No. 61/777,566, filed on Mar. 12, 2013.

(51) Int. Cl.
C02F 1/46 (2006.01)
C02F 1/467 (2006.01)
C02F 1/461 (2006.01)

(52) U.S. Cl.
CPC ........... *C02F 1/4674* (2013.01); *C02F 1/4618* (2013.01); *C02F 2001/46142* (2013.01); *C02F 2001/46171* (2013.01)

(58) Field of Classification Search
CPC .......... C02F 1/4674; C02F 1/4618; C02F 2001/46171; C02F 2001/46142
See application file for complete search history.

(56) References Cited

U.S. PATENT DOCUMENTS

| 4,374,714 A | 2/1983 | Hekel |
| 4,472,256 A | 9/1984 | Hilbig |
| 5,037,519 A | 8/1991 | Wiscombe |

(Continued)

FOREIGN PATENT DOCUMENTS

| DE | 4430391 | 2/1996 |
| JP | 2001179194 | 7/2001 |

(Continued)

OTHER PUBLICATIONS

PCT International Search Report and Written Opinion; Apr. 28, 2015; US.

(Continued)

*Primary Examiner* — Arun S Phasge
(74) *Attorney, Agent, or Firm* — Dennis D. Brown; Brown Patent Law, P.L.L.C.

(57) ABSTRACT

An apparatus, system, and method for producing electro-chemically activated water wherein (1) a dilute aqueous salt solution is first delivered through a preliminary reactor which has an anode element and a cathode element but does not have a membrane element positioned between the anode and the cathode and (2) the product from the preliminary reactor is then delivered through an activation reactor having a membrane element positioned between the anode and cathode elements thereof.

16 Claims, 6 Drawing Sheets

(56) References Cited

U.S. PATENT DOCUMENTS

| | | | |
|---|---|---|---|
| 5,916,505 | A | 6/1999 | Cisar et al. |
| 5,932,171 | A | 8/1999 | Malchesky |
| 6,391,185 | B1 | 5/2002 | Shvarev et al. |
| 6,521,810 | B2 | 2/2003 | Shapiro et al. |
| 6,638,364 | B2 | 10/2003 | Harkins et al. |
| 8,123,865 | B2 | 2/2012 | Kirkpatrick et al. |
| 8,147,889 | B2 | 4/2012 | Kirkpatrick et al. |
| 8,206,647 | B2 | 6/2012 | Kirkpatrick |
| 8,293,669 | B2 | 10/2012 | Kirkpatrick |
| 8,506,724 | B2 | 8/2013 | Kirkpatrick |
| 2006/0140998 | A1 | 6/2006 | Nakanishi et al. |
| 2007/0017820 | A1 | 1/2007 | Anderson et al. |
| 2007/0186368 | A1 | 8/2007 | Fields et al. |
| 2007/0227904 | A1* | 10/2007 | Miller .............. B01D 61/422 205/742 |
| 2007/0243597 | A1 | 10/2007 | Kenyon et al. |
| 2008/0066803 | A1 | 3/2008 | Wu et al. |
| 2008/0128272 | A1 | 6/2008 | Sonoda et al. |
| 2008/0260922 | A1 | 10/2008 | Kirkpatrick et al. |
| 2009/0008268 | A1 | 1/2009 | Salathe et al. |
| 2009/0199866 | A1 | 8/2009 | Kirkpatrick |
| 2009/0199872 | A1 | 8/2009 | Kirkpatrick |
| 2009/0199987 | A1 | 8/2009 | Spindler et al. |
| 2009/0202661 | A1 | 8/2009 | Kirkpatrick |
| 2009/0203516 | A1 | 8/2009 | Kirkpatrick |
| 2012/0024696 | A1 | 2/2012 | Tomantschger |
| 2012/0097201 | A1 | 4/2012 | Field |

FOREIGN PATENT DOCUMENTS

| | | |
|---|---|---|
| RU | 2277512 | 6/2006 |
| SU | 1101419 | 7/1984 |
| WO | WO03042112 | 5/2003 |
| WO | WO2004031337 | 4/2004 |
| WO | WO2009098599 | 8/2009 |
| WO | WO2007093395 | 10/2009 |
| WO | WO2012166997 A2 | 12/2012 |

OTHER PUBLICATIONS

Brauwelt International, "Optimized Hygiene in the Beverage Filling Process", 2009, pp. 300-302, vol. 2009, No. V, Published in: US.

Uhl, Hartman, Kreckel, "Bacterial Regrowth and Disinfection Byproduct Removal in Granular Activated Carbon Filters in Pool Water Treatment", Published in: US.

Okazaki, et al., "Machine Translation of Japanese Patent to Okazaki, PN JP2005-0346382", Dec. 22, 2005,Published in: JP.

Uhl & Hartmann, "Disinfection By-Products and Microbial Contamination in the Treatment of Pool Water With Granular Activated Carbon", Published in: US.

Erfinder, et al., International Search Report for PCT/EP2007/001265.

Kirkpatrick, et al., "PCT International Search Report by ISA/EP for PCT/IB2009/005356", Aug. 13, 2009.

Camper, et al., "Bacteria Associated With Granular Activated Carbon Particles in Drinking Water", Applied and Environmental Microbiology, Sep. 1986, pp. 434-438, vol. 52, No. 3; Published in: US.

* cited by examiner

METHOD FOR ELECTRO-CHEMICAL ACTIVATION OF WATER

RELATED CASE

This application claims the benefit of U.S. Provisional Patent Application Ser. No. 61/777,566 filed on Mar. 12, 2013 and incorporates said provisional application by reference into this document as if fully set out at this point.

FIELD OF THE INVENTION

The present invention relates to methods, apparatuses, and systems for producing electro-chemically activated aqueous solutions.

BACKGROUND OF THE INVENTION

Electro-chemically activated (ECA) water is produced from dilute dissociative salt solutions by passing an electrical current through the solution to produce catholyte and/or anolyte products. The catholyte, which is the solution exiting the cathodal chamber of the activation reactor cell, is an anti-oxidant which typically has a pH in the range of from about 8 to about 13 and an oxidation-reduction potential (ORP) in the range of from about −200 mV to about −1100 mV. The anolyte, which is the solution exiting the anodal chamber, is an oxidant which typically has a pH in the range of about 2 to about 8, an ORP in the range of from about +300 mV to about +1200 mV or more, and a Free Available Oxidant (FAO) concentration of ≤300 ppm by weight.

During the electrochemical activation of aqueous saline solutions, various oxidative and reductive species can be present, for example: HOCl (hypochlorous acid); $ClO_2$ (chlorine dioxide); $OCl^-$ (hypochlorite); $Cl_2$ (chlorine); $O_2$ (oxygen); $H_2O_2$ (hydrogen peroxide); $OH^-$ (hydroxyl); and $H_2$ (hydrogen). The presence or absence of any particular reactive species in the solution is predominantly influenced by the derivative salt used and the final solution pH. So, for example, at a pH of 3 or below, HOCl tends to convert to $Cl_2$, which increases the toxicity level of the product. At a pH of below 5, low chloride concentrations tend to produce HOCl, but high chloride concentrations typically produce $Cl_2$ gas. At a pH above 7.5, hypochlorite ions ($OCl^-$) are typically the dominant species. At a pH of greater than 9, the oxidants (chlorites and hypochlorites) tend to convert to non-oxidants (chloride, chlorates and perchlorates) and active chlorine (i.e. defined as $Cl_2$, HOCl and $ClO^-$) is typically lost due to conversion to chlorate ($ClO_3^-$). At a pH of 4.5-7.5, the predominant species are typically HOCl (hypochlorous acid), $O_3$ (ozone), $O_2^{2-}$ (peroxide ions) and $O^{2-}$ (superoxide ions).

For this reason, anolyte will typically predominantly comprise species such as ClO; $ClO^-$; HOCl; $OH^-$; $HO_2$; $H_2O_2$; $O_3$; $S_2O_8^{2-}$ and $Cl_2O_6^{2-}$, while catholyte will typically predominantly comprise species such as NaOH; KOH; $Ca(OH)_2$; $Mg(OH)_2$; $HO^-$; $H_3O_2^-$; $HO^{2-}$; $H_2O_2^-$; $O_2^-$; $OH^-$ and $O_2^{2-}$. The order of oxidizing power of these species is: HOCl (strongest)>$Cl_2$>$OCl^-$ (least powerful). Therefore, anolyte can have a much higher antimicrobial and disinfectant efficacy in comparison to that of catholyte, or of commercially available stabilized chlorine formulations used at the recommended dosages.

The anolyte and catholyte solutions will typically be produced by electro-chemically activating a dilute aqueous saline solution comprising in the range of from about 1 to about 9 grams of salt per liter of water. The salt can be any inorganic salt. The salt will preferably be non-iodated sodium chloride (NaCl) or potassium chloride (KCl).

Prior to use, the electro-chemically activated anolyte product will typically be diluted with water. The diluted anolyte solution will typically comprise at least 50 parts by volume of non-activated water per 50 parts by volume of concentrated anolyte. More typically, the diluted anolyte solution will have a water-to-anolyte volume ratio of at least 60:40. In each case, the parts by volume ratio of water to concentrated anolyte will typically not be greater than 98:2, will more typically not be greater than 95:5, will more typically be in the range of from about 94:6 to about 60:40, and will most typically be in the range of from about 93:7 to about 65:35.

One type of reactor cell 1 used in the art for producing electro-chemically activated water solutions is depicted in FIG. 1. The reactor cell 1 is a flat plate reactor cell which comprises: a negatively charged cathodal plate 7 positioned within a container 2 on one side thereof; a positively charged anodal plate 6 positioned in the container 2 opposite the cathodal plate 7; a ceramic membrane 5 which is positioned within the container 2 between the cathode 7 and the anode 6; an anodal flow chamber 3 formed in the container 2 between the ceramic membrane 5 and the anodal plate 6; and a cathodal flow chamber 4 formed in the container 2 between the ceramic membrane 5 and the cathode 7.

Another type of reactor cell 11 used in the art for producing electro-chemically activated water solutions is depicted in FIG. 2. The reactor cell 11 is a cylindrical cell which comprises: a negatively charged outer cathodal cylinder 17; a positively charged, coaxial anodal rod 16 which extends through the cathodal cylinder 17; a coaxial cylindrical ceramic membrane 15 which is positioned within the cathodal cylinder 17 between the interior wall of the cathodal cylinder 17 and the exterior surface of the anodal rod 16; a cylindrical cathodal flow chamber (annulus) 14 formed between the ceramic membrane 15 and the cathodal cylinder 17; and a cylindrical anodal flow chamber (annulus) 13 formed between the ceramic membrane 15 and the anodal rod 16.

The anodal rod 16 will typically be formed of titanium and will be coated with an oxide of a platinum group metal such as iridium or ruthenium. The cathodal cylinder 17 will typically be formed of titanium.

The operation of the plate-type reactor cell 1 depicted in FIG. 1 or the cylindrical reactor cell 11 depicted in FIG. 2 can be varied significantly depending upon the particular solution properties desired. In one aspect, the properties of the electro-chemically activated product solution(s) can be varied by changing the flow rate of the aqueous saline solution through the reactor cell and/or by changing the amount of electrical current applied to the dilute saline solution. In addition, the product solutions and solution properties can also be altered by changing the flow pattern of the dilute aqueous saline solution through the reactor cell such that (1) the saline solution is delivered through the anodal chamber and the cathodal chamber in co-current flow; (2) the saline solution is delivered through the anodal chamber and the cathodal chamber in countercurrent flow; (3) a portion of the catholyte recovered from the cathodal chamber is recirculated through the anodal chamber; and/or (4) all of the catholyte recovered from the cathodal chamber is recirculated through the anodal chamber.

By way of example, in one application, it is known in the art that electro-chemically activated anolyte solutions can be added to foods, water, beverages, or pharmaceuticals, or can be used as disinfectants, purification agents, odor neutralization agents, flavor neutralizing agents, or for other purposes in food, water, beverage, and pharmaceutical processing systems. Prior to being diluted with water, the concentrated anolyte solutions used in these applications will typically be neutral or only slightly acidic solutions having a pH in the range of from about 5 to about 7.5, an oxidation-reduction potential (ORP) of at least +400 mV, a free available oxidant (FAO) content of ≤300 ppm by weight and a free available chlorine content (FAC) of 30-200 ppm by weight. These anolyte solutions will more preferably have a pH in the range of from about 6 to about 7.3 and will most preferably have a pH in the range of from about 6.5 to about 7.2. In addition, these anolyte solutions, in undiluted form, will most preferably have an ORP of at least +600 mV.

An example of a procedure used in the art for producing a slightly acidic or pH neutral anolyte product of this type using either a plate-type reactor cell 1 as depicted in FIG. 1 or a cylindrical reactor cell 11 as depicted in FIG. 2 involves the steps of: separately harvesting a concentrated catholyte solution from the cathodal flow chamber; reintroducing at least some of the catholyte solution into the anodal flow chamber, preferably in the absence of any fresh water; and manipulating the flow rate, the hydraulic flow configuration, and the pressure and temperature of the catholyte through the anodal chamber as needed so as to produce an anolyte solution that is characterized in that it predominantly includes the species HOCl (hypochlorous acid), $O_3$ (ozone), $O_2^{2-}$ (peroxide ions) and $O_2^{2-}$ (superoxide ions), and has a Free Available Oxidant (FAO) concentration of ≤300 ppm by weight.

Unfortunately, however, one shortcoming of this procedure for producing a highly effective yet neutral to slightly acidic anolyte which is safe for human consumption is that a significant amount, or sometimes substantially all, of the catholyte is consumed by recirculation through the anodal flow chamber. Thus, oftentimes, very little or substantially none of the catholyte product can be independently harvested for other uses.

Another shortcoming of this procedure is that a significant amount of the chloride ions in the dilute brine feedstock are not converted during the electro-chemical activation process. The presence of a higher concentration of unreacted chloride ions in the anolyte product is viewed as presenting an increased risk of corrosion which could shorten the life of the reactor components and coatings.

Moreover, chlorides are already present in most water sources and the addition of any further chloride load can create concerns, for example, for beverage producers and other users of stainless steel processing equipment. In many cases, the original equipment manufacturer will not guarantee equipment which is exposed to chloride levels of greater than 55 ppm, and in some cases even less.

Unfortunately, to reduce the residual chloride content and increase the FAC levels of these anolyte products using a traditional prior art reactor system configuration, it would be necessary to use a high brine concentration, a very low flow rate, and an increased amount of electrical current. This would result in premature failure of the reactor system due to coating failure, and would also significantly reduce the amount of anolyte product produced.

SUMMARY OF THE INVENTION

The present invention provides an electro-chemical reaction apparatus, method and system which satisfy the needs and alleviate the problems discussed above. The inventive apparatus, method, and system operate to: (1) significantly increase the brine conversion ratio in the electro-chemical activation process; (2) significantly reduce the residual chloride levels in the anolyte and catholyte products; (3) allow the amount of salt used in the dilute brine feed solution to be significantly reduced; (4) provide increased catholyte production; (5) reduce the risk of corrosion; (6) increase the life of the system components; and (7) provide increased anolyte production capacity. The present invention also allows the use of smaller brine tanks and reduces or eliminates the need to heat the dilute brine feedstock.

In one aspect, there is provided an apparatus for producing an electro-chemically activated water solution comprising: (a) at least one preliminary reactor for converting a dilute aqueous salt solution to an intermediate solution and (b) an activation reactor for producing at least an electro-chemically activated anolyte solution from the intermediate solution. The preliminary reactor comprises an anode element and a cathode element having no membrane element positioned therebetween. The activation reactor comprises an anode element, a cathode element, and a membrane element positioned between the anode element and the cathode element such that an anodal chamber is formed between the anode element and the membrane element and a cathodal chamber is formed between the cathode element and the membrane element.

In another aspect, there is provided an apparatus for producing an electro-chemically activated water solution comprising at least one activation reactor and at least one preliminary reactor positioned upstream of said activation reactor, wherein: (a) the activation reactor comprises at least one anode element, at least one cathode element, a membrane element positioned between the anode element and the cathode element, an anodal flow chamber formed between the anode element and the membrane element, and a cathodal flow chamber formed between the cathode element and the membrane element; (b) the preliminary reactor comprises at least one anode element and at least one cathode element; (c) the cathode element of the preliminary reactor is spaced apart from the anode element of the preliminary reactor to provide a fluid flow path between the cathode element and the anode element of the preliminary reactor; and (d) the preliminary reactor has no membrane element positioned between the cathode element and the anode element of the preliminary reactor.

In another aspect, the preliminary reactor used in the inventive apparatus preferably comprises a housing having a plurality of anode plate elements and a plurality of cathode plate elements installed therein wherein: (1) the cathode plate elements are positioned in an alternating, parallel, side-by-side relationship in the housing with the anode plate elements such that each of the cathode plate elements is positioned adjacent to at least one of the anode plate elements and (2) the preliminary reactor has no membrane elements positioned between any adjacent pair of the anode and the cathode plate elements. Further, it is also preferred that the fluid flow path of the preliminary reactor travel through the housing between each adjacent pair of the anode and the cathode plate elements.

In another aspect, when using a preliminary reactor of this nature, the inventive apparatus will preferably comprise a plurality of activation reactors configured to operate in parallel downstream of, and to each simultaneously receive a portion of a product fluid from, the preliminary reactor.

In another aspect, each anode element of the preliminary reactor preferably has a surface which is preferably at least partially coated with one or more mixed metal oxides.

Examples of suitable mixed metal oxides include, but are not limited to, oxides of ruthenium, iridium, and/or other platinum group metals.

In another aspect, there is provided a method of producing an electro-chemically activated aqueous anolyte solution comprising the steps of: (a) delivering a dilute aqueous salt solution through a preliminary reactor to produce an intermediate solution, wherein the preliminary reactor comprises a positively charged anode element and a negatively charged cathode element, but has no membrane element positioned between the anode and cathode elements and (b) delivering the intermediate solution through an activation reactor to produce at least an electro-chemically activated aqueous anolyte solution.

In another aspect, there is provided a process for producing electro-chemically activated water comprising the steps of: (a) delivering a dilute aqueous salt solution along a fluid flow path through a preliminary reactor to produce an intermediate solution, the preliminary reactor comprising at least one positively charged anode element and at least one negatively charged cathode element, the cathode element being spaced apart from the anode element such that the fluid flow path travels between the cathode element and the anode element, and the preliminary reactor having no membrane element positioned between the cathode element and the anode element; (b) delivering the intermediate solution through an activation reactor comprising at least one positively charged anode element, at least one negatively cathode element, a membrane element positioned between the anode element and the cathode element of the activation reactor, an anodal flow chamber formed between the anode element of the activation reactor and the membrane element, and a cathodal flow chamber formed between the cathode element of the activation reactor and the membrane element; and (c) recovering an aqueous anolyte product solution from the anodal flow chamber of the activation reactor.

In another aspect, when implementing the inventive process, it is also preferred that the dilute aqueous salt solution used in step (a) have a salt concentration of not more than 2 g or not more than 1 g of salt per liter of water and that an amount of electrical current be applied to the dilute aqueous salt solution in step (a) and an amount of electrical current be applied to the intermediate solution in step (b) such that:
the intermediate solution produced from the dilute aqueous salt solution in step (a) has a pH of at least 8;
the intermediate solution produced from the dilute aqueous salt solution in step (a) also has a free available chlorine content of at least 40 ppm by weight;
at least 25% of all chloride ions present in the dilute aqueous salt solution prior to step (a) are converted in steps (a) and (b) to other products; and/or
the aqueous anolyte product solution recovered from the anodal flow chamber of the activation reactor in step (c), in undiluted form, has a free available chlorine concentration of at least 230 ppm by weight.

In another aspect, the inventive process can further comprise the step of (d) adding non-activated water to the aqueous anolyte product solution recovered from the anodal flow chamber of the activation reactor to produce a diluted anolyte solution comprising at least 50 parts by volume of the non-activated water per 50 parts by volume of the aqueous anolyte product solution and having a chloride content of not more than 55 ppm (more preferably not more than 45 ppm) by weight and a free available chlorine content of at least 30 ppm (more preferably at least 35 ppm) by weight. More preferably, the diluted anolyte solution produced in step (d) comprises at least 80 parts by volume of the non-activated water per 20 parts by volume of the aqueous anolyte product solution and most preferably comprises 90 parts by volume of non-activated water per 10 parts by volume of the aqueous anolyte product solution.

Further aspect features and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

Figure 3:
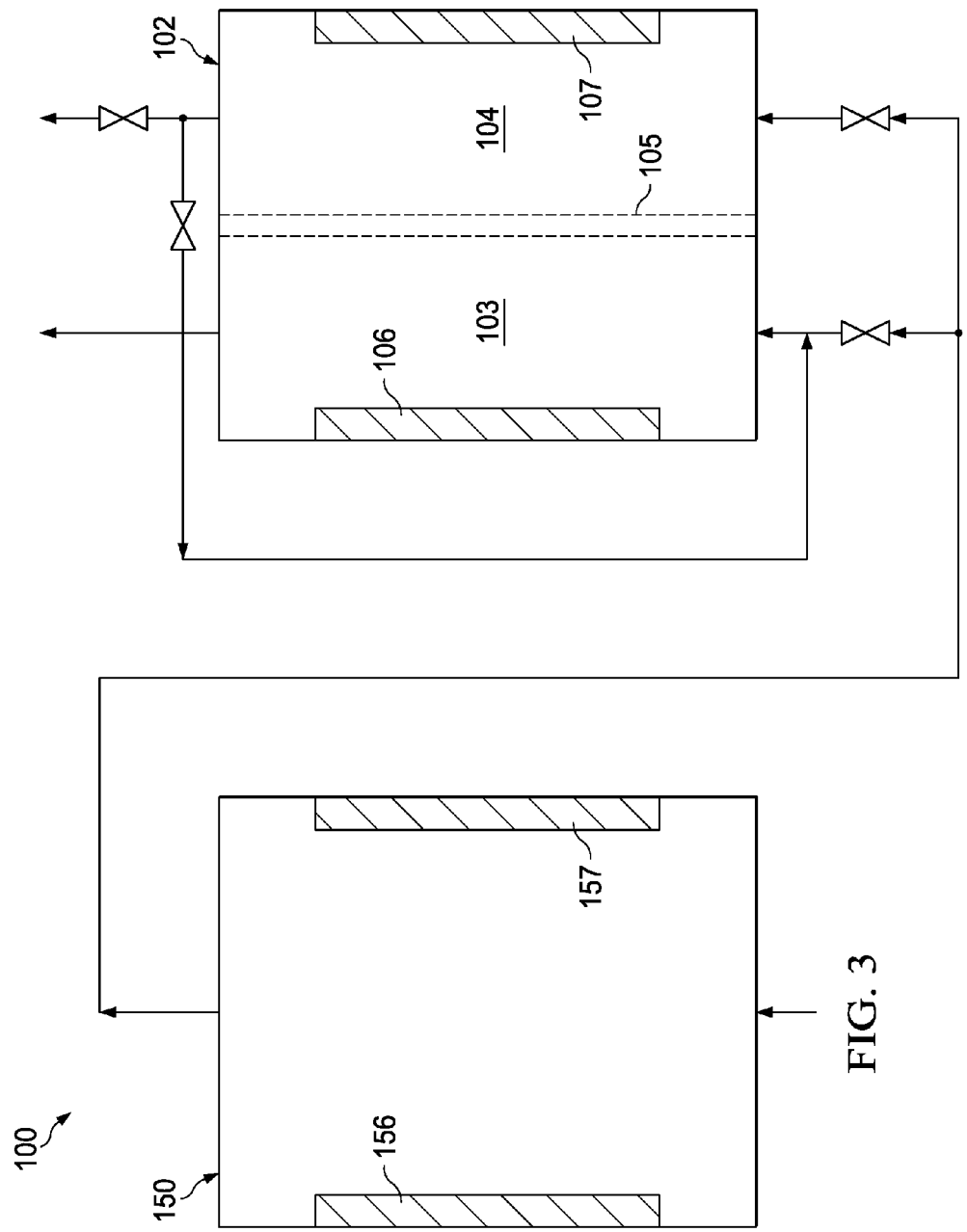
FIG. 3 schematically illustrates an embodiment 100 of the electro-chemical activation system provided by the present invention.

An embodiment 100 of the electro-chemical activation system provided by the present invention is illustrated in FIG. 3. The inventive activation system 100 comprises an activation reactor 102 which is positioned downstream of a preliminary reactor 150.

Figure 1:
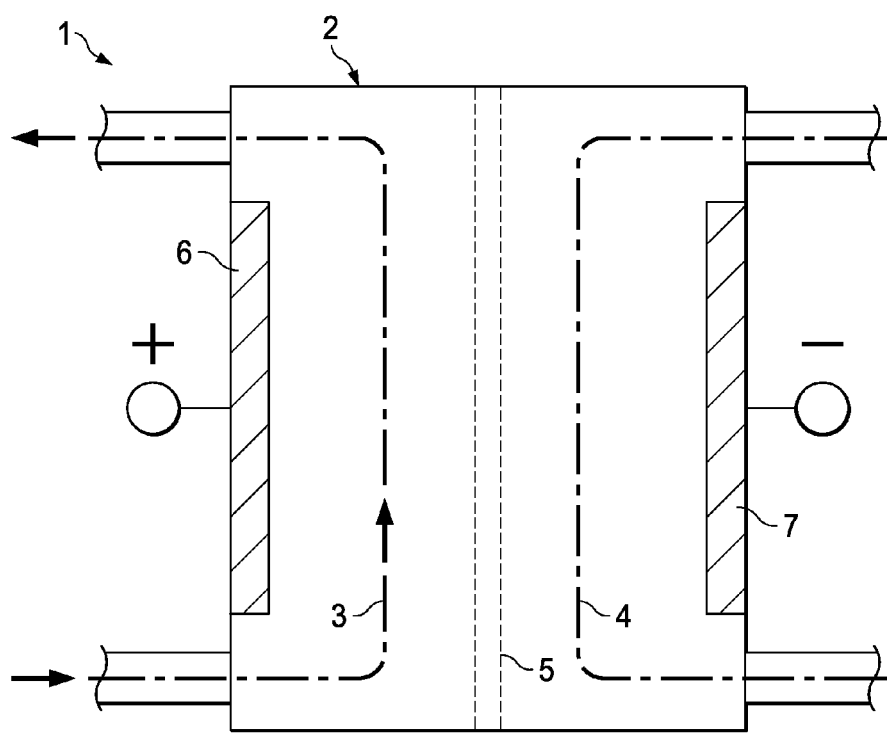
FIG. 1 is a cutaway schematic elevational view of a prior art plate-type reactor cell 1 for producing electro-chemically activated aqueous solutions.
Figure 2:
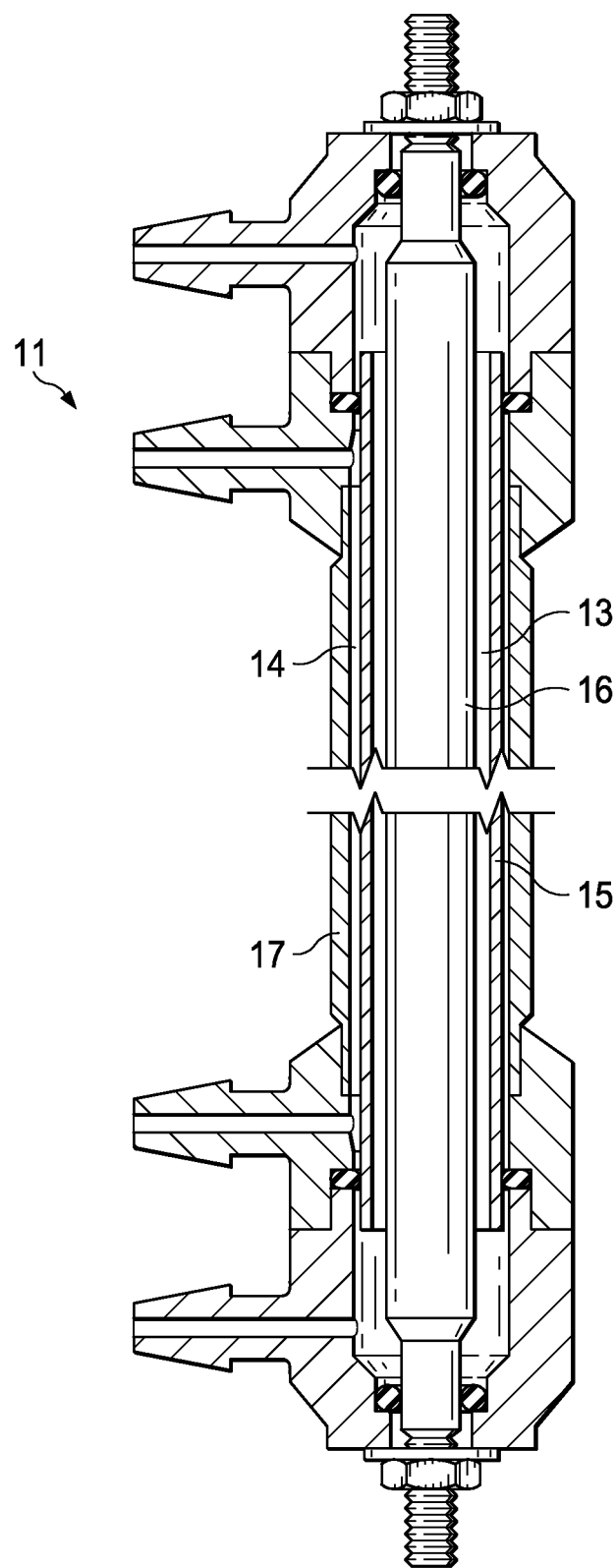
FIG. 2 is a cutaway elevational view of a prior art cylindrical reactor cell 11 for producing electro-chemically activated aqueous solutions.

The activation reactor 102 can be a plate-type reactor cell 1 of the type illustrated in FIG. 1, a cylindrical reactor cell 11 of the type illustrated in FIG. 2, or any other type of electro-chemical activation cell comprising: a positively charged anode element 106; a negatively charged cathode element 107; a membrane element 105 positioned between the anode element 106 and the cathode element 107; an anodal flow chamber 103 formed between the anode element 106 and the membrane element 105; and a cathodal flow chamber 104 formed between the cathode element 107 and the membrane element 105.

The membrane element 105 will preferably be a zirconium-based ceramic membrane including oxides of aluminum and yttrium.

The anode element 106 will preferably be formed of titanium. In addition, the surface of the anode element 106 which is exposed to the aqueous solution traveling through the anodal chamber 103 will preferably be either partially or entirely coated with one or more, preferably a plurality, of platinum group metal oxides such as, but not limited to, oxides of ruthenium and/or iridium.

The cathode element 107 will preferably be formed of titanium.

The preliminary reactor 150 is similar to the activation reactor 102 in that the preliminary reactor 150 comprises a positively charged anode element 156 and a negatively charged cathode element 157. In addition, the anode and cathode elements 156 and 157 of the preliminary reactor 150 can be of a plate type configuration as illustrated in FIG. 1, a coaxial cylindrical configuration as depicted in FIG. 2, or any other configuration used in the art for reactor cells. However, the preliminary reactor 150 differs from the activation reactor 102 in that, in the preliminary reactor 150, there is no membrane element positioned between the anode 156 and the cathode 157.

The anode element 156 of the preliminary reactor 150 will preferably be formed of titanium. In addition, the surface of the anode element 156 which is exposed to the aqueous solution traveling through the preliminary reactor 150 will preferably be either partially or entirely coated with one or more mixed metal oxide materials. Examples of mixed metal oxide materials suitable for coating the anode 156 include, but are not limited to, oxides of ruthenium and oxides of iridium.

The cathode element 157 will preferably be formed of titanium. In addition, the surface of the cathode 157 which is exposed to the aqueous solution traveling through the preliminary reactor 150 will either be uncoated or may be either partially or entirely coated with one or more oxides of ruthenium and/or iridium.

It will also be noted that the preliminary reactor cell 150 and the activation reactor cell 102 can be of the same type of configuration or can be of different configurations. For example, the preliminary reactor cell 150 and the activation reactor cell 102 can each be of a plate-type construction or can each be of a cylindrical construction. Alternatively, the preliminary reactor cell 150 could be of a plate-type construction and the activation reactor cell 102 could be a cylindrical reactor, or vice versa. It will also be understood that (a) multiple activation reactor cells 102 can be positioned downstream of a single preliminary reactor cell 150 or (b) multiple preliminary reactor cells 150 arranged in a parallel and/or series configuration can be positioned upstream of a single activation reactor cell 102, or upstream of multiple activation reactor cells 102.

Figure 4:
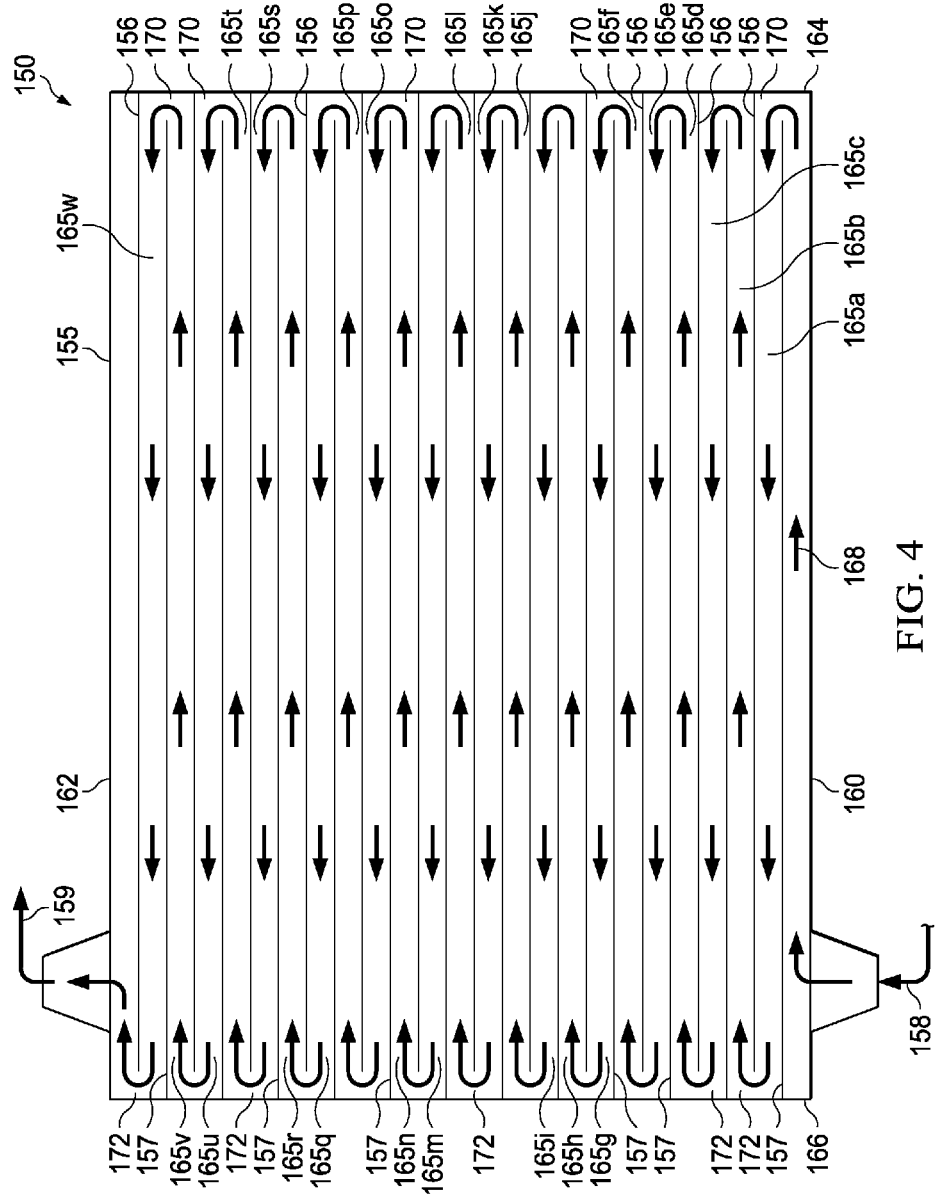
FIG. 4 schematically illustrates a cut-away top view of a preferred inventive embodiment of a preliminary reactor 150 used in the inventive electro-chemical activation system.

A preferred inventive embodiment of the preliminary reactor 150 used in the inventive electro-chemical activation system 100 is illustrated in FIG. 4. The inventive preliminary reactor 150 illustrated in FIG. 4 comprises: a reactor block housing 155 having a vertical front wall 160, a vertical back wall 162, a vertical right wall 164, and a vertical left wall 166; a plurality of parallel, vertical, positively charged anode plates 156 extending from right to left in the housing 155; a plurality of vertical, negatively charged cathode plates 157 extending from left to right in the housing 155 in an alternating, parallel, side-by-side relationship with the anode plates 156; a brine feed inlet 158 provided in the front wall 160 of the housing 155; and a product outlet 159 provided in the back wall 162 of the housing 155.

In the particular embodiment of the inventive preliminary reactor 150 illustrated in FIG. 4, twelve anode plates 156 are alternatingly installed in the housing 155 with twelve cathode plates 157. As noted above, there are no membrane elements installed in the preliminary reactor 150 in the flow gaps 165 *a-w* between any of the adjacent pairs of anode plates 156 and cathode plates 157. In addition, each of the anode plates 156 begins at the right side wall 164 of the housing 155 but does not extend all of the way to the left side wall 166 whereas each of the cathode plates 157 begins at the left side wall 166 but does not extend all of the way to the right side wall 164. The resulting alternating gaps 170 between the cathode plates 157 and the right wall 164 and gaps 172 between the anode plates 156 and the left wall 166 allow the brine feed solution to reverse course as it travels through the preliminary reactor 150. Consequently, the dilute brine feed solution delivered into the feed inlet 158 in the front wall 160 of the preliminary reactor 150 flows sequentially from left to right and from right to left along a flow path 168 through the flow gaps 165 *a-w* between each successive pair of anode and cathode plates 156 and 157 until the solution reaches the product outlet 159 in the back wall 162 of the housing 155.

Figure 5:
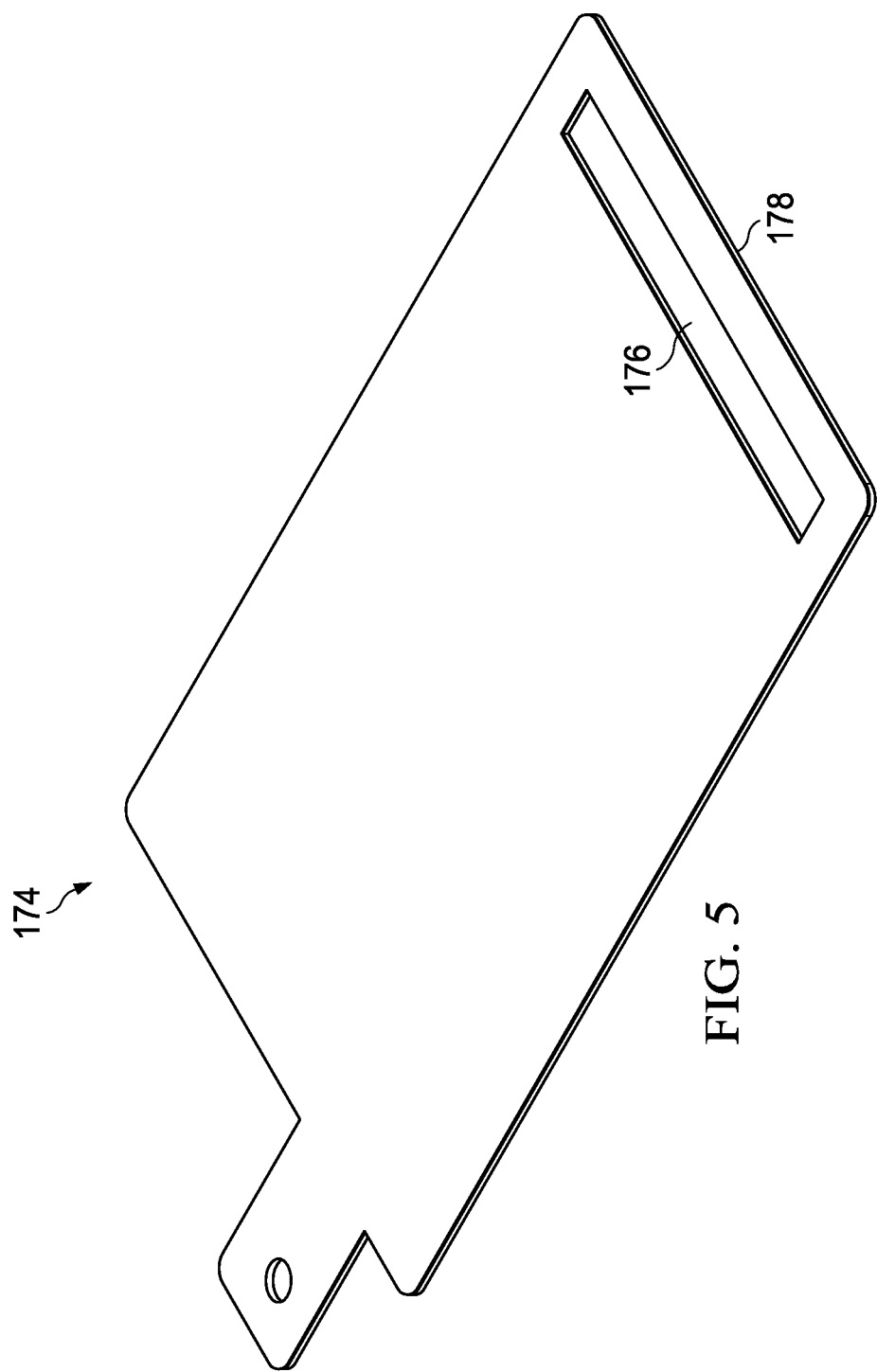
FIG. 5 is a perspective view of an alternative plate element 174 for use in the inventive preliminary reactor 150.

An alternative form of plate element 174 which can be used in the preliminary reactor 150 as a replacement for the anode and cathode plates 156 and 157 of FIG. 4 is shown in FIG. 5. In contrast to the plates 156 and 157, the plate 174 will extend all of the way from the right side wall 164 to the left side wall 166 of the preliminary reactor housing 155. However, to allow the same serpentine flow pattern 168 through the preliminary reactor 150 as provided by the shorter plates 156 and 157, the alternative plate 174 has a vertically extending flow opening 176 provide adjacent to the distal end 178 thereof.

In addition, as yet another alternative, by changing the locations of the brine feed inlet 158 and the product outlet 159, eliminating the flow gaps 170 and 172, and/or making other apparent charges, the dilute brine feed could be distributed and delivered simultaneously in parallel flow through all of the flow gaps 165 *a-w* between the adjacent pairs of anode and cathode plates 156 and 157 in the preliminary reactor 150.

The number of alternating anode and cathode plates 156 and 157 in the inventive preliminary reactor 150, the size of the flow gaps between the parallel anode and cathode plates 156 and 157, the height, width, and overall volume of the inventive preliminary reactor 150, and the amount of electrical current applied can be varied as necessary to provide an intermediate product solution feed stream for one activation reactor 102, or for any desired number of activation reactors 102 operating in parallel, downstream of the preliminary reactor 150.

The inventive preliminary reactor 150 illustrated in FIG. 4 having 12 anode plates 156 and 12 cathode plates 157, for example, is well suited for feeding a block of 12 cylindrical activation reactors operating in parallel downstream of the preliminary reactor 150. However, an example of another preferred embodiment of the inventive preliminary reactor 150 for feeding the block of 12 activation reactors operating in parallel would be to use only six anode plates 156 and six cathode plates 157 in the preliminary reactor housing 155. The six and six embodiment of the preliminary reactor 150 draws less electrical current and will thus more readily accommodate a slightly higher brine feed salt content (e.g., 1 g/liter versus 0.7 g/liter for a twenty-four plate unit) in the event that a higher ultimate anolyte FAC content or better quality catholyte product is desired.

In the method of the present invention, a dilute salt solution is delivered through the preliminary reactor cell 150 to produce an intermediate solution. The intermediate solution is then delivered through the activation reactor 102 to produce an activated anolyte product solution and to preferably also produce an activated catholyte product solution.

The dilute salt solution delivered to the preliminary reactor 150 will typically comprise from about 2.5 to about 9 grams of salt per liter of water and will preferably comprise from about 0.5 to about 9 grams of salt per liter of water. The dilute salt solution will more preferably comprise from about 0.5 to about 3 g of salt per liter of water and will still more preferably comprise from about 0.5 to about 2 g of salt per liter of water or from about 0.5 to about 1 g of salt per liter of water. The dilute salt solution will most preferably comprise about 1 g or less of salt per liter of water. The salt can be any inorganic salt. The salt will preferably be non-iodated sodium chloride (NaCl) or potassium chloride (KCl).

The flow rate of the dilute saline solution and the amount of electrical current applied to the solution in the preliminary reactor 150 will preferably be such that the intermediate solution produced by the preliminary reactor 150 will have a pH in the range of from about 7 to about 13, preferably from about 7 to about 10.5, and more preferably from about 7 to about 10, and a free active chlorine (FAC) concentration of at least 30 and more preferably at least 40 or at least 80, ppm by weight. The intermediate solution will more preferably have a pH in the range of from about 8 to about 10 and will most preferably have a pH of about 9.5. In addition, the intermediate solution will more preferably have a FAC concentration of at least 130 ppm and will more preferably have and FAC concentration in the range of from about 200 to about 300 ppm by weight.

The flow rate of the intermediate solution and the amount of electrical current applied to the intermediate solution in the activation reactor 102 will preferably be such that, when the activated salt solution exits the activation reactor 102 in its final activated form, at least 15%, more preferably at least 20% and still more preferably at least 25%, of the chloride ions in the original dilute saline feed solution will have been converted to other reaction products. More preferably, at least 30% or at least 60% or at least 80% of the chloride ions present in the feed solution will be converted to other products in the inventive activation system 100.

In addition, the flow rate of the intermediate solution and the amount of electrical current applied to the solution in the activation reactor 102 will preferably be such that the anolyte product exiting the activation reactor 102 will have a pH in the range of from about 6 to about 8 and an FAC concentration of at least 150 ppm by weight. The anolyte product will more preferably have a pH in the range of from about 6.5 to about 7.5 and will still more preferably have a pH in the range of from about 6.7 to about 7.2. Further, the FAC concentration of the anolyte product will more preferably be at least 200 ppm and will still more preferably be at least 230 ppm by weight. More preferably, the anolyte product will have a pH of from about 6.8 to about 7.1 and a FAC concentration of at least 250 ppm, most preferably from about 300 ppm to about 400 ppm, by weight.

As will be understood by those in the art, any flow arrangement through the activation reactor 102 can be used which is effective for achieving these results. However as compared to prior reactor systems, the inventive reactor system 100 is capable of producing neutral or near neutral anolyte solutions of the type described above while reducing or substantially eliminating the need to recycle the catholyte from the cathodal chamber 104 through the anodal chamber 103 of the activation reactor 102. Consequently, the inventive activation system 100 significantly increases the amount of a catholyte product material which can be separately harvested from the activation reactor 102.

Figure 6:
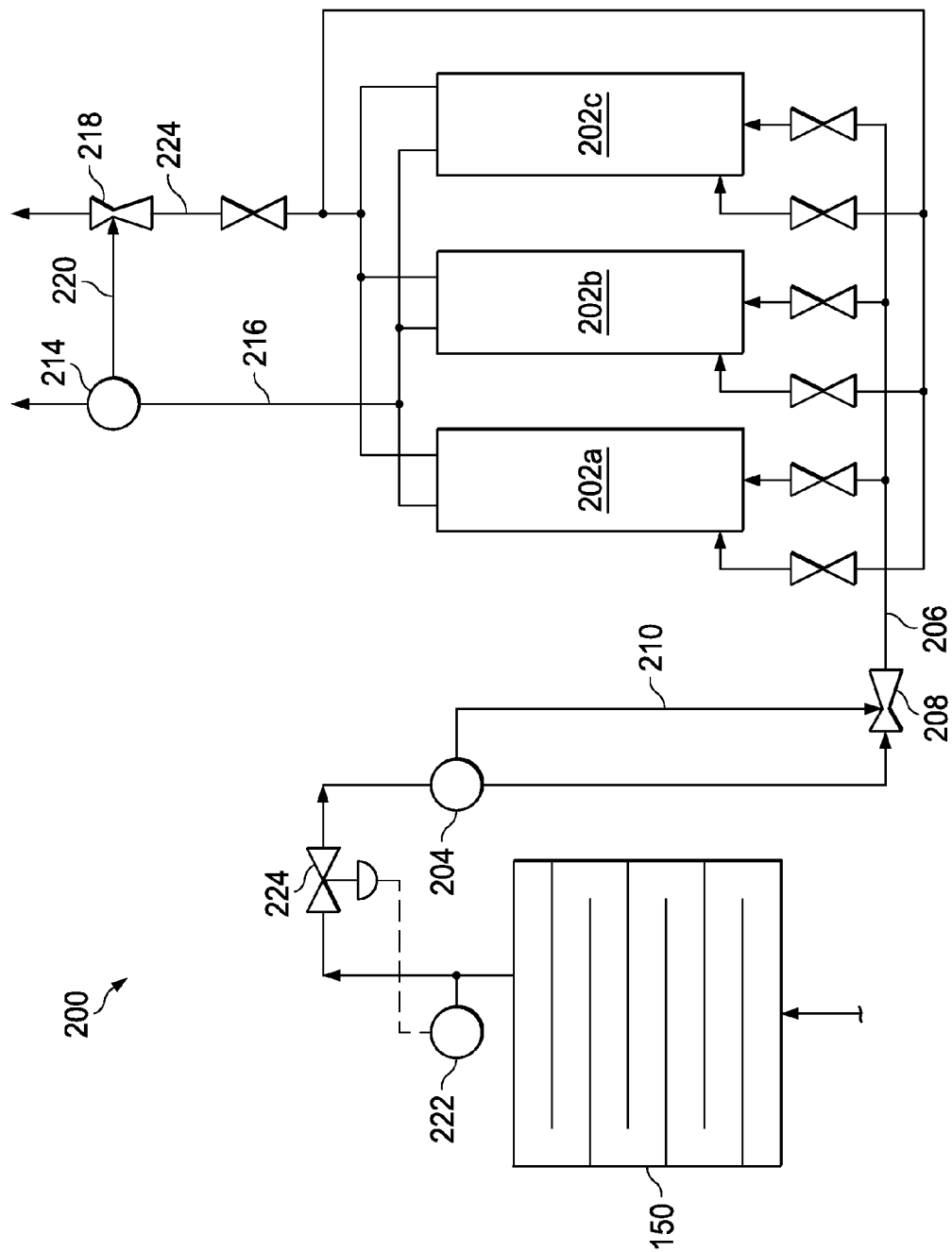
FIG. 6 schematically illustrates an alternative embodiment 200 of the inventive electro-chemical activation system.

An alternative embodiment 200 of the invent activation system is illustrated in FIG. 6. The inventive activation system 200 preferably comprises: a preliminary reactor 150 of the type shown in FIG. 4; a plurality of cylindrical activation reactors 202 a-c operating in parallel downstream of the preliminary reactor 150; a gas trap or other gas recovery device 204 installed in the intermediate product line 206 extending between the preliminary reactor 150 and the activation reactors 202 a-c; a venturi injector or other injection device 208 located in the intermediate product line 206 downstream of the gas trap 204 and having a suction inlet line 210 connected to the gas recovery device 204; a gas trap or other gas recovery device 214 optionally installed in the anolyte product line 216 from the activation reactors 202 a-c; and a venturi injector or other injection device 218 optionally installed in the catholyte product line 224 from the activation reactors 202 a-c and having a suction inlet 220 extending to the anolyte gas recovery device 214.

As illustrated in the inventive activation system 200, it will typically be the case for either embodiment of the inventive system that an amount of hydrogen gas will be produced in the preliminary reactor 150. The subsequent presence of this hydrogen gas in the activation reactor(s) 202 a-c surprisingly operates to enhance the activation results obtained in the inventive activation system 200 by, for example, increasing the amount, consistency, and evenness of the electrical current applied to the intermediate solution in the activation reactor(s) 202 a-c and thus improving the stability and consistency of the pH, ORP, electrical conductivity, and FAC values of the anolyte product.

In order to ensure that a desired amount of the hydrogen gas produced in the preliminary reactor 150 is carried into the activation reactor(s) 202 a-c by the intermediate product solution on a more consistent and constant basis, the above-mentioned gas-trap or other gas recovery device 204 can be installed, as illustrated in FIG. 6, between the preliminary reactor 150 and the activation reactor(s) 202 a-c to capture the gas formed in the preliminary reactor 150. This gas, or at least a desired portion thereof, can then be re-introduced at a consistent, controlled rate into the intermediate solution stream downstream of the trap 204 and prior to the activation reactor(s) 202 a-c using the venturi injector or other injection device 208 installed in the intermediate product line 206.

In addition, a pressure controller 222 and an associated pressure control valve 224 can be installed in the intermediate product line 206 for monitoring and controlling the back pressure in the preliminary reactor 150. The operating pressure in the preliminary reactor 150 will preferably be maintained within a range of from about 0.5 bar to about 2.5 bar and will more preferably be maintained within a range of from about 1.0 bar to about 2.0 bar. The pressure controller 222 can also be used to increase or decrease the dwell time of the dilute brine feed solution in the preliminary reactor 150.

As further illustrated in FIG. 6, in addition to the gas trap or other gas recovery device 204 installed between the preliminary reactor 150 and the activation reactors 202 a-c, the optional second gas trap or other gas recovery device 214 installed after the activiation reactors 202 a-c in the anolyte product line 216 operates to recover hydrogen from the anolyte product. At least a portion of hydrogen recovered by the recovery device 214 can then be injected, using the venturi injector or other injection device 218, into the catholyte product stream harvested from the inventive activation system 200. The addition of the recovered hydrogen gas to the harvested catholyte product steam increases the pH of the catholyte product, thereby yielding a surprisingly strong and soapy catholyte.

Also, if further catholyte production is desired for the inventive activation system 100 or 200, or for a conventional electro-chemical activation system, the overall catholyte production of the system can be additionally increased by installing a dedicated catholyte reactor or reactor block wherein water is delivered through the anolyte chamber(s) of the reactor(s) and brine is only delivered through the catholyte chamber(s). The catholyte produced by the catholyte reactor(s) can then be mixed with the catholyte produced by the main activation system 100 or 200 and sent to storage.

Example 1

Tests were conducted which involved passing a dilute aqueous brine solution through a modified cylindrical "pre-activation" reactor prior to activating the solution in an unmodified cylindrical reactor cell. The modified pre-activation reactor comprised an inner anode and outer cathode having the same specifications as used for a regular cylindrical reactor cell, except that the ceramic membrane was removed from between the anode and cathode in the modified cell.

In the tests, two such modified "pre-activation" reactors were used and two unmodified "activation" reactors of the same type were used, each one of the modified reactors being installed in series prior to one of the unmodified reactors.

In preliminary tests, the intermediate solution exiting the modified, pre-activation reactors had a relatively high pH of above 8.0 indicating that a mixed oxidant solution was created with hypochlorite being the main component. The intermediate solution had a FAC concentration of 80 ppm. The intermediate solution produced by the pre-activation reactors was then fed into the unmodified reactors for further activation.

The dilute aqueous feed solutions used in these tests had NaCl concentrations of 2 g/l or 1 g/l. The voltage and amps drawn for each of the unmodified activation reactors was 12V and 15 A per reactor. When the modified preliminary reactor cells were added prior to the unmodified reactors, the current drawn by the preliminary reactor cells was about 8 A.

Initial testing was conducted with the 2 g/l brine solution, first without the modified pre-activation reactors and then with the pre-activation reactors. A substantial increase in FAC was observed (405 ppm by weight using pre-activation versus only 154 ppm by weight without pre-activation) and the brine conversion was also increased from 12.7% without pre-activation to 33.5% using pre-activation. The residual chlorides in the anolyte product were also significantly reduced from a level of 1053 ppm by weight without pre-activation to a level of 802 ppm weight using pre-activation.

Following the 2 g/l tests, tests were conducted with the 1 g/l brine solution. As with the 2 g/l tests, there was also an increase in FAC content with pre-activation (284 ppm by weight with pre-activation versus only 80 ppm weight without) and the chlorine conversion increased substantially from 12% without pre-activation to 45% using pre-activation, with residual chloride levels dropping from 550 ppm (no pre-activation) down to 346 ppm (using pre-activation).

| Parameter | 2 g/l without pre-activation | 2 g/l with pre-activation | 1 g/l without pre-activation | 1 g/l with pre-activation |
|---|---|---|---|---|
| No. of pre-activation reactors | 0 | 2 | 0 | 2 |
| No. of activation reactors | 2 | 2 | 2 | 2 |
| Flow (l/hr) | 33.6 | 33.6 | 24 | 24 |
| Flow per reactor (l/min) | 0.28 | 0.28 | 0.2 | 0.2 |
| Brine Conductivity | 3.87 | 3.87 | 2.02 | 2.02 |
| salt concentration (g/l) | 2.01 | 2.01 | 1.05 | 1.05 |
| Chloride Concentration (feed) | 1207 | 1207 | 630 | 630 |
| FAC 100% Anolyte (ppm) | 154 | 405 | 80 | 284 |
| pH 100% Anolyte | 6.8 | 6.8 | 6.8 | 6.9 |
| EC 100% Anolyte | 3.68 | 3.56 | 1.856 | 1.814 |
| ORP 100% Anolyte | 822 | 847 | 805 | 808 |
| Temp 100% Anolyte | 30 | 41.8 | 25 | 43.9 |
| Chlorine conversion | 12.76 | 33.55 | 12.7 | 45.08 |
| Residual Chlorides (ppm) | 1053 | 802 | 550 | 346 |

The amount of the increase in FAC content and the amount of the reduction in residual chloride content achieved by the inventive process were surprising. In addition, a further unexpected and surprising result of the inventive process was that the temperature of the activated products leaving the inventive system was desirably increased from 25-30° C. (without pre-activation) to 40-44° C. (using pre-activation).

Also, with pre-activation using the modified preliminary reactors, increased catholyte production was also provided. This was due to the increased pH of pre-activated intermediate solution which was fed to the main activation reactors. In contrast, in the prior art configuration with no pre-activation, a much lower pH anolyte solution was formed in activation the reactors, thus requiring a greater amount of catholyte recirculation through the anodal chamber in order to neutralise the low pH anolyte material.

For further comparison purposes, two unmodified prior art reactors (with membranes) were operated in series using the same operating parameters as above. The problem with this configuration was that the anolyte produced was very acidic and became more and more acidic as it travelled through the reactors in series. Consequently, the system was unable to produce a sufficient amount of catholyte to neutralise the acidic anolyte material. All of the catholyte was consumed and the resulting anolyte solution still had a pH of only 4.

In contrast, in the inventive system, by removing the membrane from the preliminary reactor, a higher pH intermediate feed solution was produced, thus reducing the amount of catholyte required for neutralization in the activation reactor and resulting in more catholyte output.

Example 2

An inventive, industrial scale activation system was operated using a dilute aqueous feed solution consisting of 0.7 grams of NaCl per liter of water. The source water used for forming the dilute aqueous feed solution was deionized water which had a chloride content of 10-12 ppm. The inventive activation system comprised a preliminary reactor 150 as illustrated in FIG. 4 followed by a block of 12 cylindrical activation reactors of the type illustrated in FIG. 2 operating in parallel. As shown in FIG. 4, the preliminary reactor 150 comprised a block housing 155 having twelve anode plates 156 and twelve cathode plates 157 installed therein in an alternating, parallel, side-by-side relationship with no membrane elements being present in the preliminary reactor 150 between any of the adjacent pairs of anode plates 156 and cathode plates 157.

The undiluted anolyte product produced by the inventive system had a pH of 6.8, a residual chloride content of 350 ppm by weight, a free available chlorine (FAC) content of 350-400 ppm by weight, and a chlorine to chloride ratio of less than 1:1. The chlorine conversion rate for the inventive system was greater than 60%. Consequently, a diluted aqueous solution comprising only a 10% concentration of the anolyte product in non-activated water had a desirable FAC content of 35-40 ppm by weight with a residual chloride content of only 35 ppm by weight.

When the same block of 12 cylindrical activation reactors was operated without the benefit of the preliminary reactor 150, to obtain a diluted aqueous anolyte solution having a FAC content of 35-40 ppm, it was necessary to (a) use a brine feed solution which contained three times more NaCl (i.e. 2.1 g of NaCl per liter of water) and (b) use twice as much (i.e., 20%) of the pure anolyte product in the aqueous dilution. Moreover, in contrast to the inventive anolyte product, the residual chloride content of the pure conventional anolyte product was 1060 ppm and the chloride content of the 20% aqueous solution of the conventional anolyte product was 212 ppm.

Consequently, in contrast to the prior art system having no preliminary reactor, the inventive activation system using the preliminary reactor 150 yielded an anolyte product which, when diluted for use, provided a desirably high FAC level while also having a desirably low residual chloride content satisfying the requirements specified by most original equipment manufacturers (OEM's). In addition, to provide diluted aqueous solutions having substantially the same FAC level, only half as much of the anolyte produced by the inventive method was required.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A process for producing electro-chemically activated water comprising the steps of:
   a) delivering a dilute aqueous salt solution along a fluid flow path through a preliminary reactor to produce an intermediate solution, said preliminary reactor comprising at least one positively charged anode element and at least one negatively charged cathode element, said cathode element being spaced apart from said anode element such that said fluid flow path travels between said cathode element and said anode element, and said preliminary reactor having no membrane element positioned between said cathode element and said anode element;
   b) delivering said intermediate solution through an activation reactor comprising at least one positively charged anode element, at least one negatively cathode element, a membrane element positioned between said anode element and said cathode element of said activation reactor, an anodal flow chamber formed between said anode element of said activation reactor and said membrane element, and a cathodal flow chamber formed between said cathode element of said activation reactor and said membrane element; and
   c) recovering an aqueous anolyte product solution from said anodal flow chamber of said activation reactor.

2. The process of claim 1 wherein said anode element of said preliminary reactor is formed of titanium and is at least partially coated with one or more mixed metal oxide materials.

3. The process of claim 2 wherein said one or more mixed metal oxide materials comprises one or more oxides of ruthenium, one or more oxides of iridium, or a combination thereof.

4. The process of claim 2 wherein said cathode element of said preliminary reactor is formed of titanium and is at least partially coated with one or more oxides of ruthenium, one or more oxides of iridium, or a combination thereof.

5. The process of claim 1 wherein said dilute aqueous salt solution used in step (a) has a salt concentration of not more than 2 g of salt per liter of water.

6. The process of claim 1 wherein said dilute aqueous salt solution used in step (a) has a salt concentration in a range of from about 0.5 g to about 1 g of salt per liter of water.

7. The process of claim 1 wherein an amount of electrical current is applied to said dilute aqueous salt solution in said preliminary reactor such that said intermediate solution produced from said dilute aqueous salt solution in step (a) has a pH of at least 8.

8. The process of claim 7 wherein said intermediate solution produced from said dilute aqueous salt solution in step (a) also has a free available chlorine content of at least 40 ppm by weight.

9. The process of claim 1 wherein an amount of electrical current is applied to said dilute aqueous salt solution in step (a) and an amount of electrical current is applied to said intermediate solution in step (b) such that at least 25% of all chloride ions present in said dilute aqueous salt solution prior to step (a) are converted to other products.

10. The process of claim 1 wherein said aqueous anolyte product solution recovered from said anodal flow chamber of said activation reactor in step (c), in undiluted form, has a free available chlorine concentration of at least 230 ppm by weight.

11. The process of claim 1 wherein said dilute aqueous salt solution used in step (a) has a salt concentration of not more than 1 g of salt per liter of water and wherein an amount of electrical current is applied to said dilute aqueous salt solution in step (a) and an amount of electrical current is applied to said intermediate solution in step (b) such that:
   said intermediate solution produced from said dilute aqueous salt solution in step (a) has a pH of at least 8;
   at least 25% of all chloride ions present in said dilute aqueous salt solution prior to step (a) are converted in steps (a) and (b) to other products; and
   said aqueous anolyte product solution recovered from said anodal flow chamber of said activation reactor in step (c), in undiluted form, has a free available chlorine concentration of at least 230 ppm by weight.

12. The process of claim 11 wherein said aqueous anolyte product solution recovered from said anodal flow chamber of said activation reactor in step (c), in undiluted form, has a pH in a range of from about 6.7 to about 7.2.

13. The process of claim 1 further comprising the step of (d) adding non-activated water to said aqueous anolyte product solution recovered from said anodal flow chamber of said activation reactor to produce a diluted anolyte solution comprising at least 50 parts by volume of said non-activated water per 50 parts by volume of said aqueous anolyte product solution and having a chloride ion content of not more than 55 ppm by weight and a free available chlorine content of at least 30 ppm by weight.

14. The process of claim 13 wherein said diluted anolyte solution produced in step (d) comprises at least 80 parts by volume of said non-activated water per 20 parts by volume of said aqueous anolyte product solution.

15. The process of claim 1 further comprising the steps, after step (a) and prior to step (b), of:
   removing a gas material from said intermediate solution and
   adding at least a portion of said gas material back to said intermediate solution at a controlled rate.

16. The process of claim 1 further comprising the steps of:
   d) recovering a catholyte product solution from said cathodal chamber of said activation reactor;
   e) removing a gas material from said anolyte product solution recovered in step (c); and
   f) adding at least a portion of said gas material recovered in step (e) to said catholyte product solution.

* * * * *